United States Patent [19]

Furubayashi

[11] Patent Number: 5,108,193

[45] Date of Patent: Apr. 28, 1992

[54] THERMAL FLOW SENSOR

[75] Inventor: Hisatoshi Furubayashi, Yamatokoriyama, Japan

[73] Assignee: Sharp Kabushiki Kaisha, Osaka, Japan

[21] Appl. No.: 644,735

[22] Filed: Jan. 23, 1991

Related U.S. Application Data

[63] Continuation of Ser. No. 438,977, Nov. 20, 1989, abandoned, which is a continuation of Ser. No. 220,380, Jul. 11, 1988, abandoned, which is a continuation of Ser. No. 896,530, Aug. 13, 1986, abandoned.

[30] Foreign Application Priority Data

Aug. 20, 1985 [JP] Japan .................. 60-183611
Aug. 22, 1985 [JP] Japan .................. 60-185100

[51] Int. Cl.$^5$ ............................................. G01F 1/68
[52] U.S. Cl. .................................... 374/164; 374/138; 73/204.26; 73/204.11
[58] Field of Search ................. 374/164, 138, 54, 147; 73/204.11, 204.25, 204.26; 338/25

[56] References Cited

U.S. PATENT DOCUMENTS

| | | | |
|---|---|---|---|
| 4,050,052 | 9/1977 | Reichelt et al. | 338/25 |
| 4,320,655 | 3/1982 | Kammermaier et al. | 73/204 |
| 4,464,646 | 8/1984 | Burger et al. | 338/25 |
| 4,565,455 | 1/1986 | Bloore et al. | 338/25 |
| 4,581,928 | 4/1986 | Johnson | 73/204 |
| 4,587,844 | 5/1986 | Sumal | 73/204 |
| 4,594,889 | 6/1986 | McCarthy | 73/204 |
| 4,624,138 | 11/1986 | Ono et al. | 73/204 |

FOREIGN PATENT DOCUMENTS

| | | |
|---|---|---|
| 0076951 | 9/1982 | European Pat. Off. . |
| 0137687 | 8/1984 | European Pat. Off. . |
| 2527505 | 1/1976 | Fed. Rep. of Germany . |
| 2302615 | 2/1976 | Fed. Rep. of Germany . |
| 2919433 | 12/1980 | Fed. Rep. of Germany . |
| 2925975 | 1/1981 | Fed. Rep. of Germany . |
| 3327653 | 2/1984 | Fed. Rep. of Germany . |
| 3430075 | 2/1986 | Fed. Rep. of Germany . |
| 2158586 | 11/1985 | United Kingdom . |
| 2170606 | 8/1986 | United Kingdom . |
| 2171799 | 9/1986 | United Kingdom . |
| 2171800 | 9/1986 | United Kingdom . |

OTHER PUBLICATIONS

Van Putten, *Sensors and Actuators* (1983) 4(3): 387–396, Middlehoek, S., ed., Elsevier Sequoia S.A. Publishers, Lausanne, Switzerland.

Huijsing et al., *IEEE Transactions on Electron Devices* (1982) ED-29(1): 133–136.

Sakamoto et al., *Proceedings of the 2nd Sensor Symposium* (1982), pp. 233–236.

Hartmann et al., (1984) VDI-Berichte No. 509, 1984, pp. 101–104.

Ref. #3009-GER/CL-T, Ref. #S 46/10-B 86 Pat vB/9/ro (Eng. & German) Mar. 13, 1987. Translation of an official action (3 pgs. each), issued by the German Patent Office. Re: German Patent Appln P3628017.8-52, Applicant Sharp K.K., filed Aug. 19, 1986.

*Primary Examiner*—William A. Cuchlinski, Jr.
*Assistant Examiner*—C. W. Fulton
*Attorney, Agent, or Firm*—Morrison & Foerster

[57] ABSTRACT

A thermal flow sensor comprising a substrate which can be etched, an electrical insulating film which is formed on said substrate and which has an etching characteristic different from that of said substrate, a heating resistor which is disposed on said insulating film, and a fluid temperature sensing resistor which is disposed on said insulating film at a certain distance from said heating resistor, the portion of said substrate corresponding to at least one of the heating resistor and the fluid temperature sensing resistor and the vicinity thereof being etched.

1 Claim, 2 Drawing Sheets

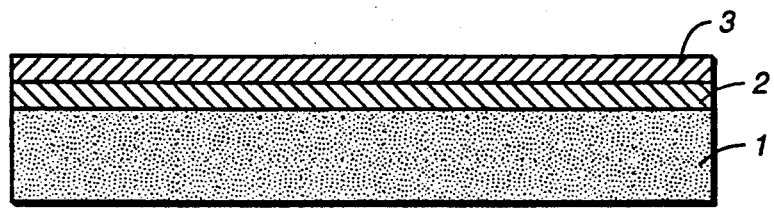
FIG._1A
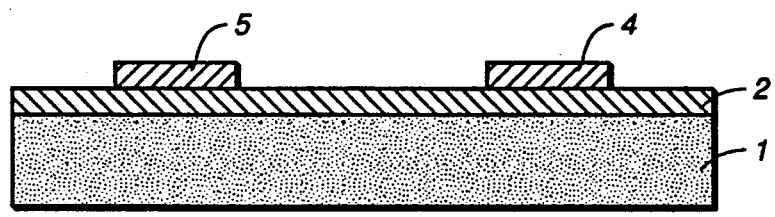
FIG._1B
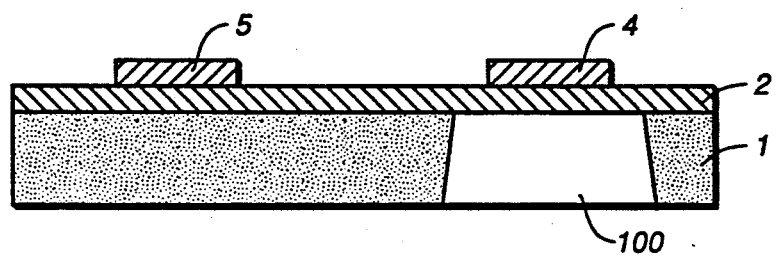
FIG._1C
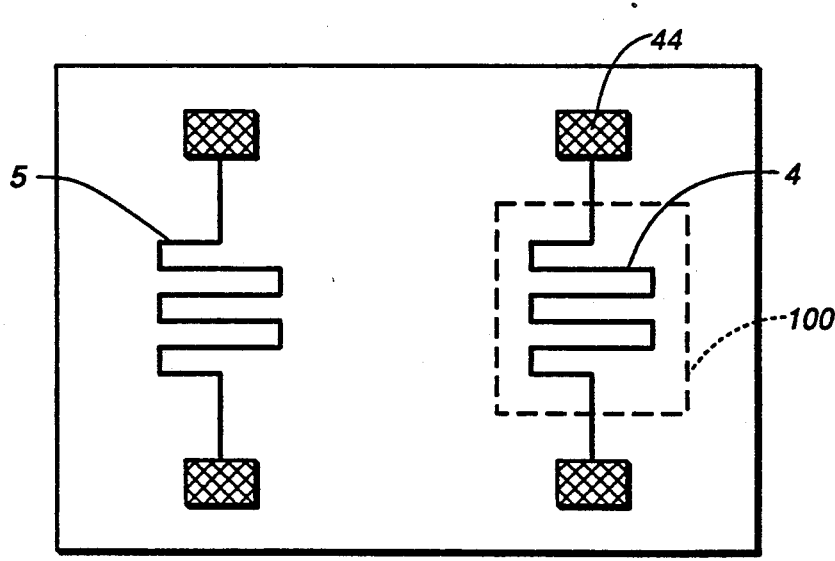
FIG._2

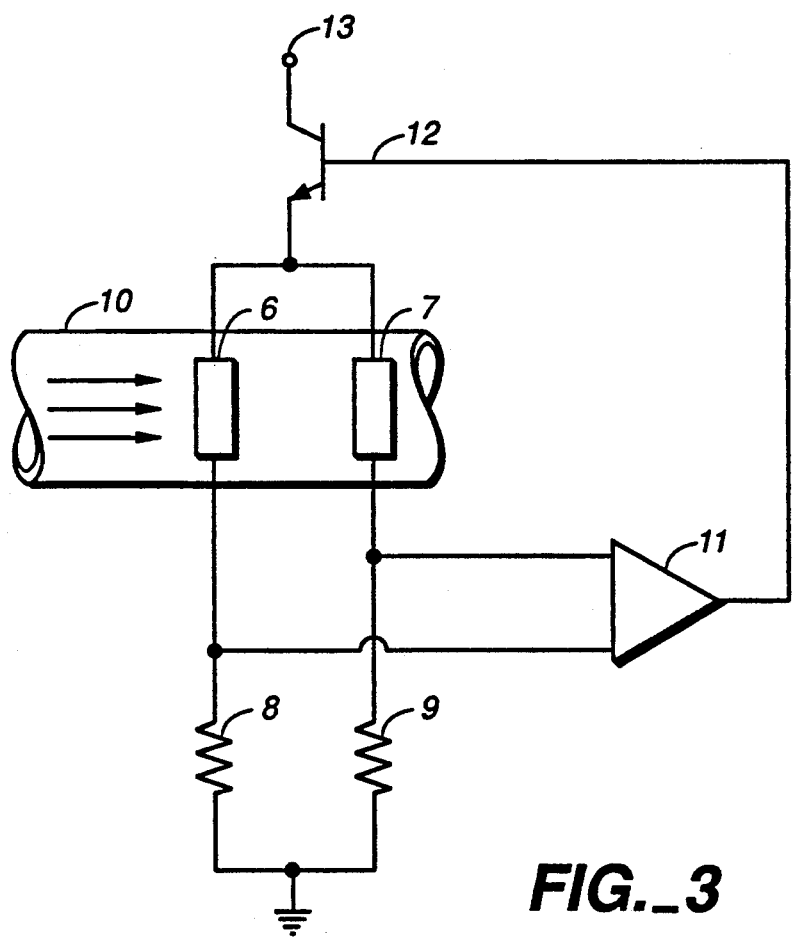
FIG._3

THERMAL FLOW SENSOR

This application is a continuation of application Ser. No. 07/438,977, filed Nov. 20, 1989 now abandoned which itself was a continuation of U.S. application Ser. No. 220,380 filed Jul. 11, 1988, now abandoned, which itself was a continuation of U.S. application Ser. No. 896,530, filed Aug. 13, 1986, also now abandoned.

BACKGROUND OF THE INVENTION

1. Field of the Invention

This invention relates to a thermal flow sensor, especially a hot film type flow sensor comprising a heating resistor and a fluid temperature sensing resistor, both of which are composed of a thin film on an insulating substrate.

2. Description of the Prior Art

As a thermal flow sensor, a flow meter in which the main flow tube is provided with a by-pass tube through which a portion of the main flow is directed and to which a heater is connected is widely used. This flow meter detects the flow rate from the distribution of heat that arises when fluid flows through the by-pass tube while the by-pass tube is heated. Such a flow meter has such excellent accuracy that it is widely used for the control of the flow rate of semiconductor gases, etc., but it is not suited for miniaturization and/or mass production. Moreover, its production cost is so high that it can only be applied to a limited field.

As another thermal flow sensor, there is a hot wire type flow sensor comprising a heating resistor (called a hot wire) and a fluid temperature sensing resistor (called a cold wire), by which the flow rate is calculated based on changes in the amount of heat transferred from the heating resistor to the fluid surrounding this heating resistor. Taking into account the temperature of the fluid detected by the fluid temperature sensing resistor, the difference in temperature between the fluid and the heating resistor is maintained at a fixed value so that compensation for changes in the fluid temperature can be made and a quick response can be obtained regardless of the heat capacity of the heating resistor. A wire of platinum, tungsten, etc., is used in the heating resistor and the fluid temperature sensing resistor. However, the resistance of the wire is small and the resistance among flow sensors is greatly scattered, so that adjustability of the heating temperature and accuracy of the temperature measurement are poor. Moreover, thin wire is used, so that manufacture is difficult and mass production is not possible.

As another thermal flow sensor, there is a hot film type flow sensor in which a thin metal film patterned on an insulating substrate is used instead of the wire of the above-mentioned hot wire type flow sensor. Due to the use of a fine patterned thin metal film, the flow sensor can be miniaturized. Moreover, since a number of units can be disposed on a single substrate, mass-production is possible and little scatter arises. Thus, this kind of flow sensor is actively being studied.

There is also a flow sensor using a heating diffusion-resistor (or transistor) and a fluid temperature sensing diffusion-resistor (or transistor) both of which are built on a silicon chip. This flow sensor is manufactured by the use of a silicon processing technique, so that it is readily mass-produced, but the temperature characteristics of the sensor are varied, resulting in difficulties of the establishment of a high heating temperature.

The hot film type flow sensor is composed of a heating resistor and a fluid temperature sensing resistor such as those of the hot wire type flow sensor, and the operation principle of the hot film type flow sensor is the same as that of the hot wire type flow sensor, which is represented by the following equation (1):

$$I^2 Rh = (A + B\sqrt{U})(Th - Ta) \tag{1}$$

wherein I is the current passing through the heating resistor, Rh is the resistance of the heating resistor, Th is the temperature of the heating resistor, Ta is the fluid temperature (i.e., the temperature of the fluid temperature sensing resistor), U is the flow rate of the fluid, and A and B, respectively, are a fixed value.

Current is, first, supplied to the heating resistor, resulting in heat generation in the heating resistor. When the flow rate of the fluid to be measured is high, a large amount of heat is transferred from the heating resistor to the fluid. On the contrary, when the flow rate of the fluid is low, a small amount of heat is transferred from the heating resistor to the fluid. Thus, the flow rate of the fluid can be determined by detecting changes in the amount of heat transferred from the heating resistor to the fluid in the following manner: Current that is applied to the heating resistor is maintained at a fixed level and the temperatures of both the heating resistor and the fluid are measured while the fluid flows. Alternatively, the difference in temperature between the fluid and the heating resistor is maintained at a fixed level by the control of current that is applied to the heating resistor, and the flow rate of the fluid can be calculated from changes in the current. Usually, because of a quick response, the latter process, in which the difference in temperature between the fluid and the heating resistor is maintained at a fixed level is used.

Even when either of the above-mentioned two processes is used, the temperature Ta of the fluid and the temperature Th of the heating resistor must be continuously measured. For this purpose, a fluid temperature sensing resistor for detecting the temperature of the fluid in addition to the temperature of the heating resistor is required. In order to detect the temperatures of both the fluid and the heating resistor with accuracy, the heating resistor and the fluid temperature sensing resistor must be thermally isolated from each other. Therefore, conventional thermal flow sensors must be provided with a structure that the heating resistor and a fluid temperature sensing resistor, respectively, are disposed on separate plates, so that these conventional thermal flow sensors become bulky and are not suitable for mass-production.

SUMMARY OF THE INVENTION

The thermal flow sensor of this invention, which overcomes the above-discussed and numerous other disadvantages and deficiencies of the prior art, comprises a substrate which can be etched, an electrical insulating film which is formed on said substrate and which has an etching characteristic different from that of said substrate, a heating resistor which is disposed on said insulating film, and a fluid temperature sensing resistor which is disposed on said insulating film at a certain distance from said heating resistor, the portion of said substrate corresponding to at least one of the heating resistor and the fluid temperature sensing resistor and the vicinity thereof being etched.

The substrate is, in a preferred embodiment, made of silicon.

The insulating film is, in a preferred embodiment, composed of a single-layered film or a multiple-layered film, which is made of at least one selected from the group consisting of alumina, zirconia, silicon nitride, and silicon oxide. Alternatively, the insulating film is made of an insulating paste.

The heating resistor and the fluid temperature sensing resistor are, in a preferred embodiment, made of one selected from platinum, nickel, a nickel alloy, and a thermistor material.

Thus, the invention described herein makes possible the objects of (1) providing a thermal flow sensor in which the heating resistor and the fluid temperature sensing resistor are disposed on a single substrate, and the portion of said substrate corresponding to at least one of these resistors and the vicinity thereof has been removed by an etching technique, so that these resistors can be thermally isolated from each other and the sensor can be miniaturized; (2) providing a thermal flow sensor which attains an excellent thermal insulation effect between the heating resistor and the fluid temperature sensing resistor, resulting in an improvement of measurement accuracy; (3) providing a thermal flow sensor which consumes less electrical power; (4) providing a thermal flow sensor which attains a quick thermal response; (5) providing a thermal flow sensor which can be mass-produced; (6) providing a thermal flow sensor in which the insulating film can be made of a paste material, so that the production of the insulating film can be readily carried out with a high mass-production efficiency; (7) providing a thermal flow sensor in which the insulating film prepared by sintering a paste material at a high temperature is strictly bound to the substrate, thereby achieving an improvement in the mechanical strength of the resulting sensor; and (8) providing a thermal flow sensor which attains a high thermal insulation effect between each of the resistors and the substrate due to the low thermal conductivity of the paste material by which the insulating film is formed on the substrate.

BRIEF DESCRIPTION OF THE DRAWINGS

This invention may be better understood and its numerous objects and advantages will become apparent to those skilled in the art by reference to the accompanying drawings as follows:

FIGS. 1(A), 1(B) and 1(C) are diagrams showing a process for the production of a thermal flow sensor of this invention.

FIG. 2 is a plane view showing the thermal flow sensor obtained by the process shown in FIGS. 1(A), 1(B) and 1(C).

FIG. 3 is a schematic diagram illustrating the operation of the thermal flow sensor obtained by the process shown in FIGS. 1(A), 1(B) and 1(C).

DESCRIPTION OF THE PREFERRED EMBODIMENTS

This invention provides a thermal flow sensor in which both the heating resistor and the fluid temperature sensing resistor are disposed on a single small-sized substrate, and the portion of the substrate corresponding to at least one of these resistors and the vicinity thereof is etched so as to thermally isolate these resistors, thereby attaining high-performance, miniaturization, and mass-production.

EXAMPLE 1

FIGS. 1(A), 1(B) and 1(C) show a process for the production of a thermal flow sensor of this invention. The process is as follows: On a substrate 1 of silicon or the like which is readily etched, an insulating film 2 of alumina or the like which is excellent in electrical insulation and chemical-resistance is formed by vacuum vapor deposition, the sputtering method, plasma assisted chemical vapor deposition, etc. Then, a thin metal film 3 of platinum or the like which has a high resistance temperature coefficient is formed on the insulating film 2 by the same method as that of said insulating film 2 as shown in FIG. 1(A), followed by patterning the thin metal film 3 by an etching technique to form a heating resistor 4 and a fluid temperature sensing resistor 5 with a given distance therebetween on the insulating film 2 as shown in FIG. 1(B). The portion of the substrate 1 which corresponds to the heating resistor 4 and the vicinity thereof is then removed by an etching technique, resulting in a hollow region 101 and a diaphragmatic structure 100 in which the heating resistor 4 is supported by the insulating film 2 alone as shown in FIG. 1(C). As shown in FIG. 2, lead-terminals 44 to be connected to the heating resistor 4 are disposed outside of the diaphragm 100, as desired, thereby preventing the diaphragm 100 from breaking in the succeeding process for the connection of a lead to the heating resistor 4. A resistance-controlling means for the heating resistor 4 is also disposed outside the diaphragm 100, as desired.

The material used for the insulating film 2 is not limited to alumina, but it can be of ceramic (e.g., zirconia, etc.,), silicon nitride, silicon oxide, etc. The insulating film is not limited to a single-layered film, but it can be composed of a multiple-layered film. The insulating film can also be made of a mixture of two or more kinds of film material. The thickness of the insulating film should be made thinner in order to enhance the thermal insulation effect, but an extremely thin film lacks mechanical strength, so that the thickness thereof should be set in the range of preferably 1 $\mu$m to 10 $\mu$m. The material for the thin metal layer 3 is not limited to platinum, but it can be nickel or a nickel alloy because of the high resistance temperature coefficient. Moreover, instead of the thin metal film 3, moisture resistor materials used in thermisters other than metals can be used.

As a technique for etching the silicon substrate 1, either an isotropic etching technique using an etchant composed of a hydrofluoric acid-nitric acid solution or an anisotropic etching technique using an ethylenediamine-pyrocatechol-water solution can be used.

In the above-mentioned example, although the portion of the substrate 1 which corresponds to the heating resistor 4 and the vicinity thereof is removed by an etching technique, the portion of the substrate 1 corresponding to the fluid temperature sensing resistor 5 and the vicinity thereof or the portions of the substrate 1 corresponding to both resistors 4 and 5 and the vicinities thereof can be, of course, removed by an etching technique. In fact, the removal of the portions of the substrate 1 corresponding to both resistors 4 and 5 and the vicinities thereof is preferable, because it enhances the thermal insulation effect thereby attaining a quick thermal response.

The resulting thermal flow sensor chip is a fine chip having a size of as small as several millimeters, so that it can be obtained by a wafery process by which a number of chips are produced at the same time. A chip obtained by cutting the wafer is fixed at the supporting plate (not shown) and connected to necessary elements by leads, resulting in a thermal flow sensor as shown in FIG. 3.

FIG. 3 shows a flow sensor using the abovementioned heating resistor and fluid temperature sensing resistor, wherein a set of the fluid temperature sensing resistor 6 and the heating resistor 7 are placed within a flow path 10 through which fluid flows in the direction of the arrow. The fluid temperature sensing resistor 6 is positioned upward of the heating resistor 7. The fluid temperature sensing resistor 6 and the heating resistor 7 are connected to electrical resistor elements 8 and 9, respectively, resulting in a bridge circuit. The connection point between the electrical resistor elements 8 and 9 is grounded. The bridge circuit is connected to a feedback circuit in which the difference in potential between one bridge resistor (composed of the fluid temperature sensing resistor 6 and the electrical resistor element 8) and the other bridge resistor (composed of the heating resistor 7 and the electrical resistor element 9) is amplified by a differential amplifier 11 to control the base potential of a transistor 12, in which the emitter terminal is commonly connected to the fluid temperature sensing resistor 6 and the heating resistor 7, allowing the transistor 12 to be driven. Both the fluid temperature sensing resistor 6 and the heating resistor 7 are controlled by the feedback circuit such that the difference in temperature between the resistor 6 and resistor 7 can be maintained at a fixed level regardless of changes in the temperature of the fluid such as an oil, a chemical reagent, a gas, etc., which flows through the path 10.

When the transistor 12 is switched on, current is supplied from an input terminal 13 to the heating resistor 7, resulting in heat generation in the heating resistor 7.

In the example shown in FIG. 3, in order to make possible the determination of the flow rate even when the temperature of the fluid varies, the fluid temperature sensing resistor 6 is disposed upward of the heating resistor 7 resulting in a bridge circuit, whereby the temperature of the fluid is measured, and current supplied to the heating resistor 7 is controlled by the feedback circuit such that the difference in temperature between the fluid and the heating resistor 7 can be maintained at a fixed level. The said temperature difference therebetween is maintained at a fixed level in the abovementioned manner, so that a quick response to changes in the flow rate can be obtained regardless of the heat capacity of the heating resistor 7. When the temperature difference is established at a high value, the output of the flow sensor can be increased.

EXAMPLE 2

Another thermal flow sensor of this invention is produced in the same manner as in Example 1, except that the insulating film 2 is made of a paste.

On the silicon substrate 1, glass paste or the like which is excellent in electrical insulation is coated by a film formation technique such as a screen-printing technique, a spin-coating technique, a spraying technique, etc., dried and sintered, resulting in an insulating film 2. The material used for the insulating film 2 is not limited to the glass paste, but can be a dielectric paste, a ceramic paste, etc. It is desirable that the thermal expansion coefficient of these paste materials is as close as possible to that of the silicon substrate 1, so that occurrence of the strain of the insulating film can be minimized thereby achieving a strong binding of the insulating film to the substrate.

In order to enhance the thermal insulation effect of the insulating film, a paste material having a small thermal conductivity is preferably used. The thickness of the insulating film 2 should be made thinner in order to reduce the thermal capacity and enhance the thermal insulation effect, but an extremely thin film lacks mechanical strength, so that the thickness thereof should be set in the range of preferably 1 $\mu$m to several tens $\mu$m.

Then, a thin metal film 3 of platinum or the like which has a high resistance temperature coefficient is formed on the insulating film 2 by vacuum vapor deposition, the sputtering method, etc., followed by patterning the thin metal film 3 in the same manner as in Example 1, resulting in the heating resistor 4 and the fluid temperature sensing resistor 5 with a given distance therebetween on the insulating film 2. Then, the diaphragmatic structure is formed in the portion of the substrate 1 corresponding to at least one of both resistors 4 and 5 and the vicinity thereof in the same manner as in Example 1, resulting in a thermal fluid sensor. As a process for etching the silicon substrate 1, an anisotropic etching technique using an etchant such as an ethylenediaminepyrocatechol-water system, an aqueous solution of potassium hydroxide, or the like is suitable in order to prevent the glass paste from being etched.

The resulting flow sensor is used and operates in the same manner as that of Example 1 shown in FIG. 3.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of manufacturing a thermal flow sensor, comprising a silicon substrate, an electrical insulating film which is formed on said substrate and a resistor structure arranged on said film, including the steps of:
    disposing said electrical insulation film (2) on said substrate by means of a film formation technique;
    forming said resistor structure on said insulating film by means of a mask-etching process; and
    etching a recess (100) in said substrate in the region of said resistor structure while leaving said electrical insulating film on said substrate.

* * * * *